Inventor:
Shao L. Soo.
By Merriam, Marshall, Shapiro + Klose
Attys.

March 17, 1970  SHAO L. SOO  3,500,614
ELECTRO-AERODYNAMIC PRECIPITATOR
Filed Dec. 10, 1969  4 Sheets-Sheet 2

Inventor.
Shao L. Soo.
By Merriam, Marshall, Shapiro & Klose
Attys.

March 17, 1970  SHAO L. SOO  3,500,614
ELECTRO-AERODYNAMIC PRECIPITATOR
Filed Dec. 10, 1969  4 Sheets-Sheet 3
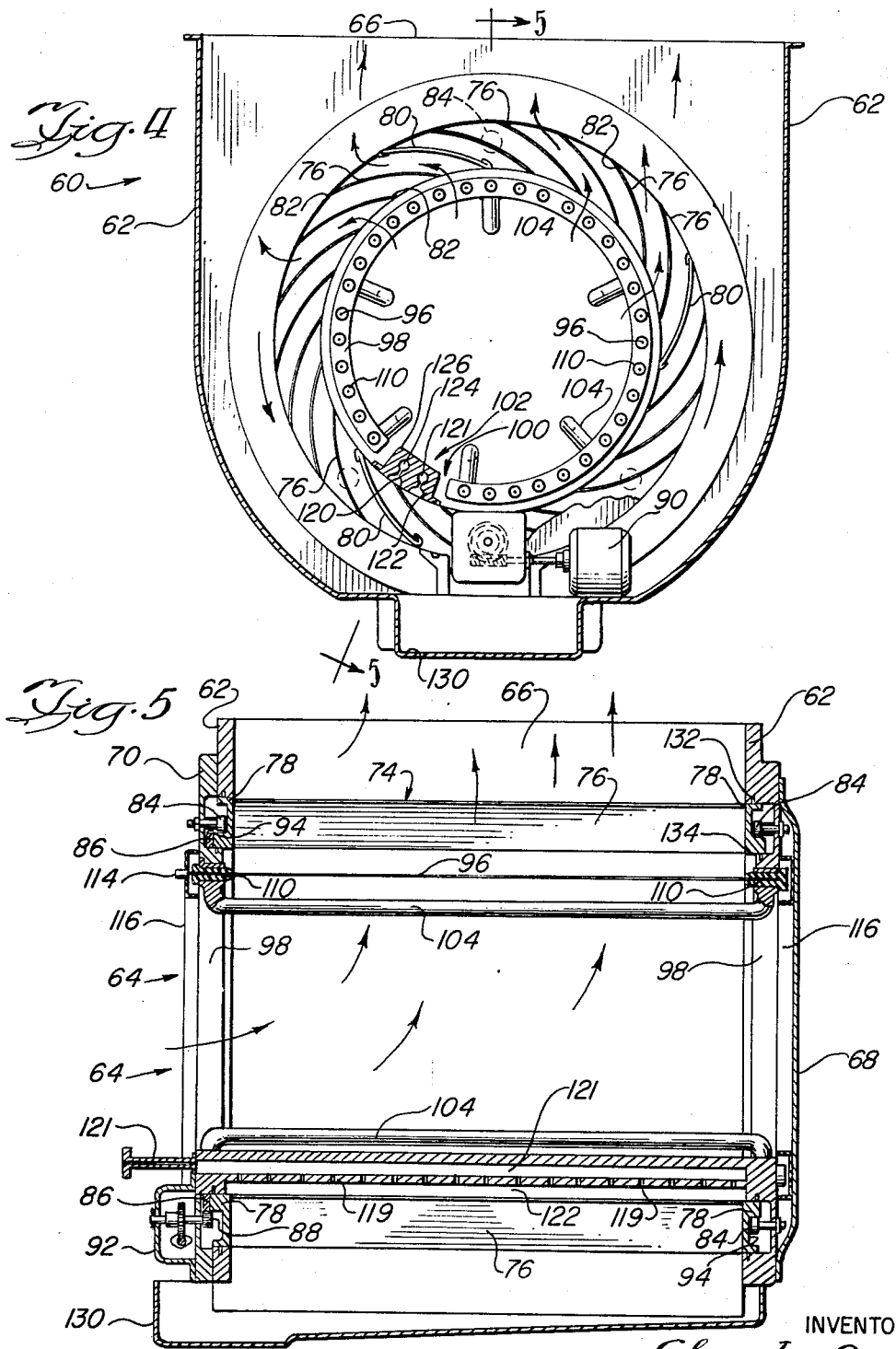

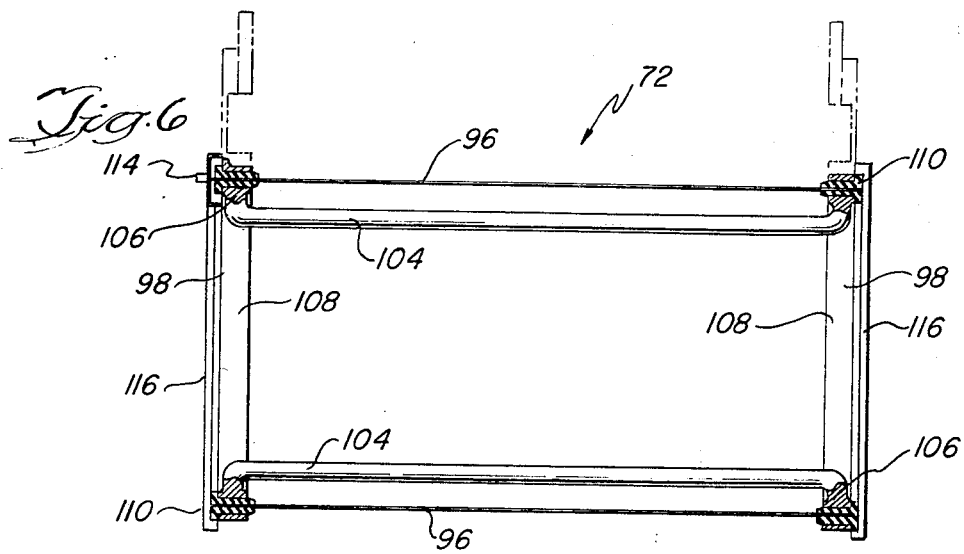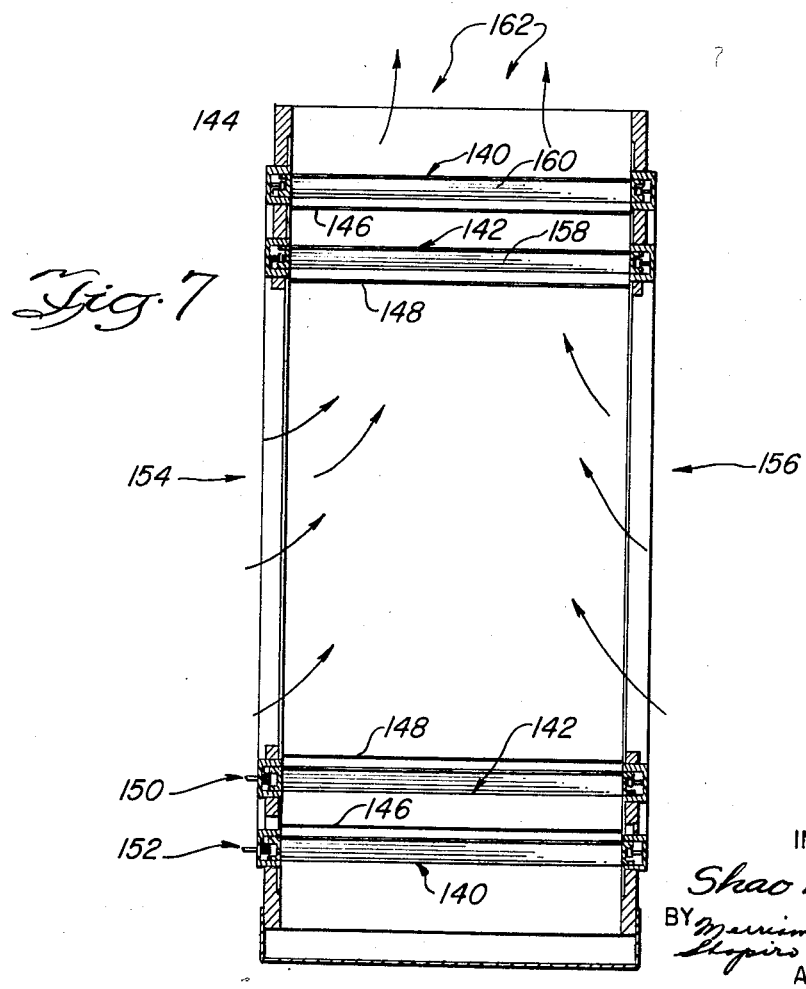

United States Patent Office 3,500,614
Patented Mar. 17, 1970

3,500,614
ELECTRO-AERODYNAMIC PRECIPITATOR
Shao L. Soo, Urbana, Ill., assignor to University of Illinois Foundation, Urbana, Ill., a corporation of Illinois
Continuation-in-part of application Ser. No. 629,981, Apr. 11, 1967. This application Feb. 10, 1969, Ser. No. 805,931
Int. Cl. B03c 3/76
U.S. Cl. 55—112         10 Claims

ABSTRACT OF THE DISCLOSURE

An electro-aerodynamic precipitator having a set of high voltage wire electrodes at a first polarity immediately adjacent a set of collecter plates at the opposite polarity with the direction of the electric field formed between the electrodes and the plates being aligned with the direction of the dust laden input gases to the precipitator. A rotary electro-aerodynamic precipitator with collector plates located approximately one-half inch or less apart with the precipitator functioning in gas flow velocities of greater than 10 feet per second.

Field of the invention

This application is a continuation-in-part of my copending application U.S. Ser. No. 629,981, filed Apr. 11, 1967. This invention relates to gas separators and, in particular, to electro-static precipitators.

Description of the prior art

In prior art electro-static precipitators, it is common to have an assembly of collector plates with a charging electrode mounted between each pair of plates and the entire assembly mounted in the dust laden gaseous stream. A source of high voltage electricity of one sign or polarity is connected to the plates and the other side of the high voltage source constituting the opposite sign or polarity is connected to the charging electrodes so as to form an electric field between the charging electrode and the respective plate on either side thereof. Since there is normally a high voltage of 10,000 volts or more between the charging electrodes and the plates, the plates are required to be separated a sufficient distance from the charging electrode to prevent undesired breakdown of the medium between the electrode and the plate which would cause unwanted shorting of the high voltage power supply. This separation is also needed where the plates are to be cleaned by rapping. Thus, all conventional electro-static precipitators contain collector plates spaced between six and eight inches apart.

In order to operate precipitators having plates separated at such distances, designers have specified the optimum gas flow velocity to be used. For instance, with the plates separated eight inches apart, the accepted optimum gas flow velocity is approximately 10 feet per second. Since most electro-static precipitators are to be used in gas flows with velocities of almost ten times the optimum flow velocity, it is required that the gas flow be slowed down before entering the precipitator.

Thus, prior art precipitators are rather large and bulky in size due to the plate spacing requirements and their efficiency becomes significantly less than desired.

Another factor contributing to the inefficient operation of prior art elector-static precipitators is the utilization of an electric field in a direction which is normal to the gas flow direction. This requires the particles to change from their original input flow diretcion to the charging field direction before they encounter the collector plates.

Furthermore, with the charging wires between the collector plates, cleaning of the plates to remove the precipitated particles may require the high voltage power supply to be removed or switched off from at least the particular set of collector plates being cleaned. This requires rather elaborate switching mechanisms to automatically turn on and off the kilovolt high voltage supply.

Summary of the invention

In accordance with the present invention there is provided an electro-aerodynamic precipitator having the electric field between the charging electrode and the collector plates maintained along the flow direction of the input dust laden gas flow. According to one aspect of this invention, the precipitator incorporates a plurality of collector plates spaced one half inch or less apart with the charging electrode supported in an external position with respect to the collector plates so as to form the electric field charging the particles in a direction aligned with the input dust laden gas flow to the precipitator.

Utilizing such a configuration enables the electro-aerodynamic precipitator of this invention to attain the following advantages over prior art precipitators:

(1) More efficient directing and collection of the charged particles in the gas flow to the collector plates since the electric field is maintained aligned with the direction of input gas flow;

(2) The use of closely spaced collector plates provides more collection units per area thus increasing the efficiency and reducing the weight and size of comparable precipitator units;

(3) Gas flow velocities of greater than ten feet per second and up to approximately 130 feet per second can be directly handled without the requirement of additional equipment to slow down the incoming gas flow. This also increases the efficiency of the unit over prior art precipitators since a greater quantity of dust laden gas can be handled per unit time;

(4) Higher charging voltages can be maintained between the charging electrodes and the collector plate without increasing the possibility of undersirable short circuiting of the high voltage power supply;

(5) If, in accordance with the principles of this invention, a number of stationary wires are utilized for the charging electrodes, such wires can be kept clean of accidentally deposited dust particles by aerodynamic flutter produced by the higher input gas flow velocity capability of the precipitator;

(6) The precipitates on the collector plates can be readily cleaned therefrom without the necessity of switching off the high voltage power supply during cleaning operations; and (7) In a rotary precipitator using the principles of the present invention, the use of stationary charging wires mounted outside of the collector plates and cleaned by aerodynamic flutter enables the rotating collector plates to be readily cleaned without synchronously switching on and off the high power voltage supply during the cleaning operation.

Brief description of the drawings

FIGURE 4 is a sectional view of an alternative embodiment of a rotary electro-aerodynamic precipitator with radio outflow in accordance with the principles of the present invention;

FIGURE 5 is a sectional view taken along the section lines V—V of FIGURE 4;

FIGURE 6 is a sectional view of the insertable electrode wire cage assembly of the precipitation shown in FIGURE 4; and FIGURE 7 is a sectional view in somewhat schematic form indicating a multi-stage precipitators according to still another aspect of this invention.

Description of the preferred embodiments

Figure 1:
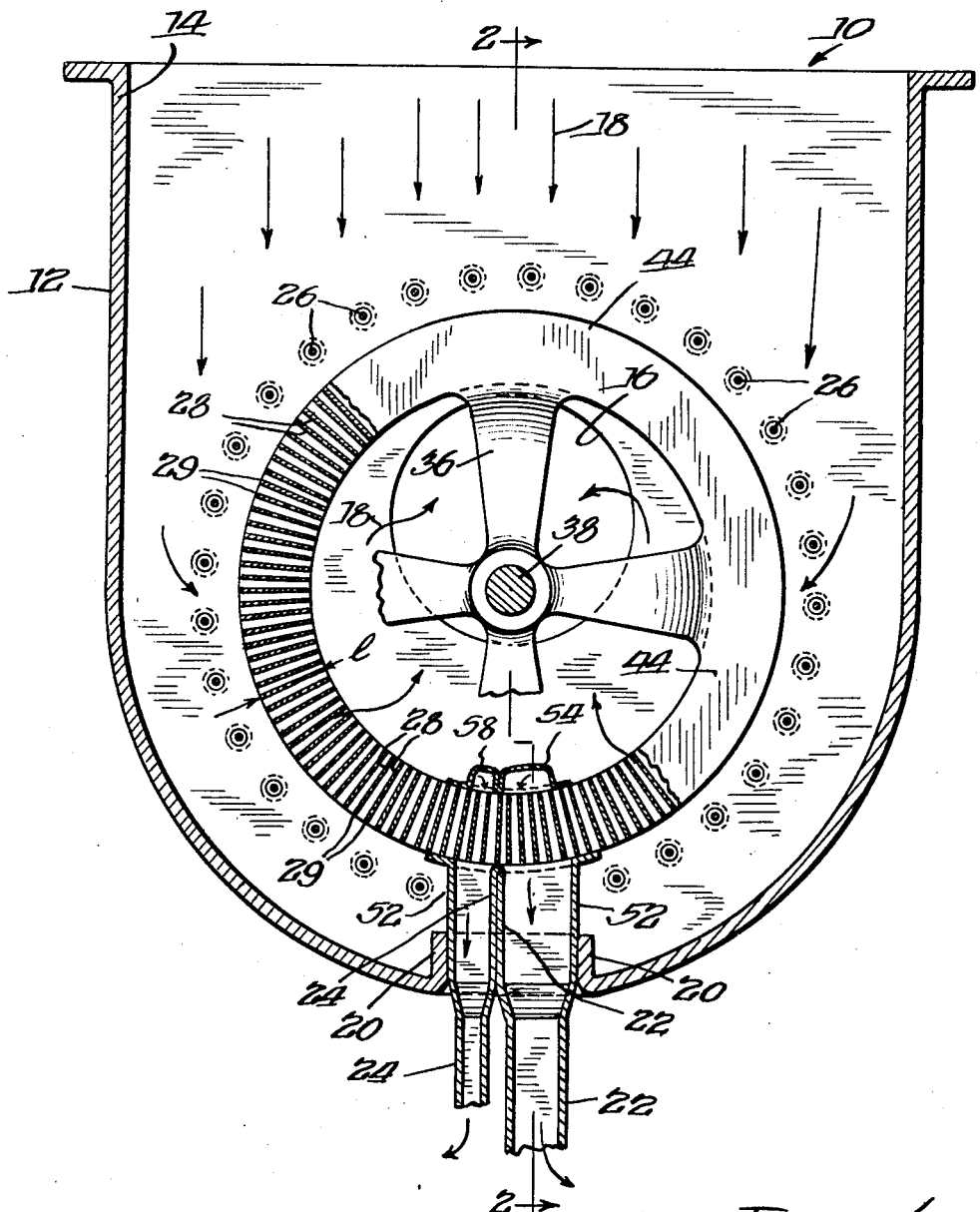
FIGURE 1 is a sectional view of a rotary electro-aerodynamic precipitator incorporating the principles of the present invention.
Figure 2:
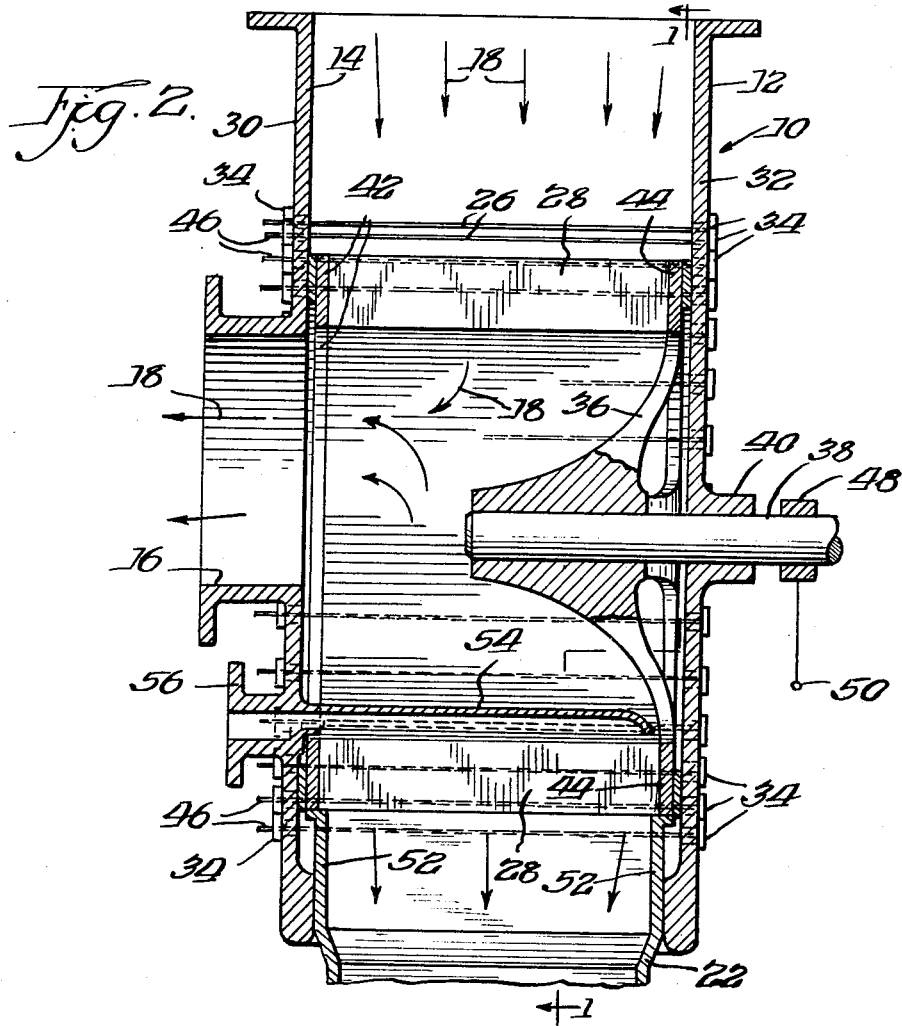
FIGURE 2 is a sectional view taken along the section lines II—II of FIGURE 1.

Referring now to FIGURES 1 and 2, there is illustrated the construction of a rotary electro-aerodynamic precipitator 10 illustrating a preferred embodiment of the present invention. The precipitator 10 includes a frame or housing 12 with an input 14 and an outlet port 16.

The direction of input flow of dirty gases is indicated generally by the reference arrows 18 illustrating the gases entering the precipitator 10 through the input port 14. After the particles have been precipitated, they are permitted to exit from the housing 12 through the outlet port 16.

As can best be seen from FIGURE 1, the housing 12 includes lower lip surfaces 20 which are welded to a cleaning return conduit 22 and a drying return conduit 24, so as to form a completely sealed unit. Therefore, the dust laden gases entering through the input port 14 into the precipitator 10 can only exit after cleaning through the output port 16.

In the path of the input dust laden gases there is placed a ring of elongated charging wires 26 and a plurality of collector plates 28. The charging wires 26 are mounted in a ring-like manner within the housing 12 between side walls 30 and 32 of the housing. Suitable electrical insulating means 34 is included for mounting the respective ends of the charging wires to the side walls to prevent undesired short circuiting between the wires and the side walls.

One end 29 of each of the collector plates 28 is radially located a distance of approximately 1 to 4 inches from the charging wires 26. The collecting plates 28 are mounted approximately ½ inch apart on the rotating drum 36. The drum 36 is rigidly attached to a drive shaft 38, with the shaft rotatably mounted in the housing 12 by suitable journal means 40 on the side wall 32 of the precipitator housing 12. The shaft 38 is driven at the free end thereof by suitable motor drive means (not shown) to rotate the drum 36.

Any suitable means can be utilized to rigidly maintain the collector plates 28 in their mounted position on the rotating drum 36. As an example, a circular disc 42 can be provided having a radial width which matches the passage length, $l$ (see FIGURE 1) of the collector plates. The collector plates 28 can then be individually vertically welded to the circular disc 42 and the assembly thereafter welded to a flat leg portion 44 of the rotating drum 36.

As shown most clearly in FIGURE 2, one end of each of the charging wires 26 protrudes through an electrically insulated aperture in the side wall 30 of the precipitator housing 12, with the charging wire being supported to the side wall by means of the insulating means 34. The protruding end forms a terminal 46 which is connected to one end of the high voltage power supply. Any well-known arrangement can be provided for connecting the collector plates to the opposite end of the power supply. As an example, by means of a brush ring 48 which is maintained in electrical conducting contact with shaft 38, the collector plates 28 can be directly coupled through brush ring terminal 50 to the other side of the high voltage power supply. It is to be particularly noted that since the charging wires are mounted outside of the space between the collector plates, this not only enables more collector plates to be utilized in a given size precipitator, but also enables a higher voltage to be maintained, if desired, between the charging wires and the collector plates, and thereby increases the collection efficiency. A suitable power supply would be a D.C. source of between 10 and 50 kv. However, the invention is not to be limited to this example, since an A.C. power source and/or different voltage ranges can be utilized.

Figure 3:
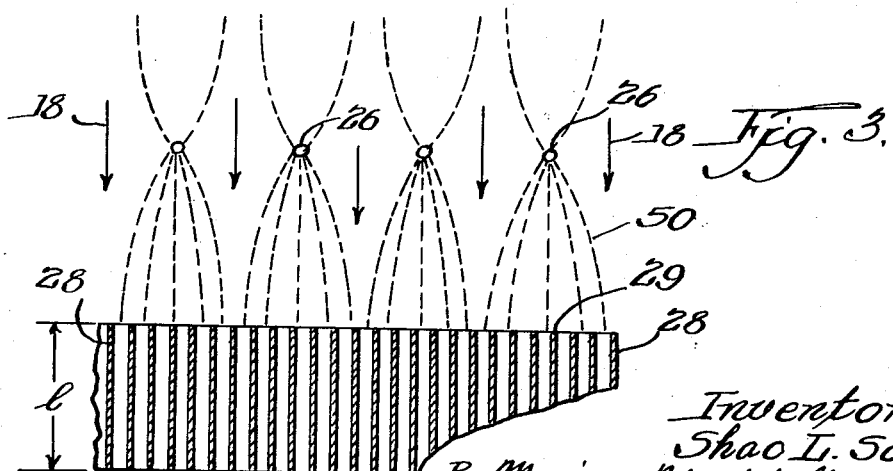
FIGURE 3 is a schematic illustration of the charging wires mounted outside of the collector plates in such a manner as to provide a charging field aligned with the direction of the input dust laden gas flow.

Particular reference may be made to FIGURE 3, wherein for purposes of illustration there is shown the substantially uniform electric field set up by the potential difference between the charging wires 26 and the collector plates 28. As can be seen from the detailed view of FIGURE 3, the established electric field (as illustrated by the dashed lines and generally indicated by the reference numeral 50) between the charging wires 26 and the collection plates 28 is arranged so as to coincide with the flow direction 18 of the input dirty gas stream. Therefore, as the dirty gas stream 18 flows into the precipitator 10 through input port 14, all of the dust particles pass through the substantially uniform electric field 50 thereby becoming charged and being propelled toward the collector plates 28 where they are collected over a very short passage length. The cleaned gas stream passes through the collector plates 28 and exits from outlet port 16.

In the arrangement as shown in FIGURE 3, it has been found that the fractional amount of particles collected as a function of the collector plate passage length, $l$, decreases rapidly from a maximum in the case of short and closely spaced collector plates. As an example, for a spacing or gap between the collector plates of approximately ½ inch, the gain in the fractional amount of particles collected in the case of collector plates having a collector passage length, $l$, of eight inches is only 5 percent as compared with collector plates having a passage length of four inches. It is, therefore, preferred that reasonably short and closely spaced collector plates 28 are utilized. As a preferred embodiment, to illustrate the principles of the present invention, collector plates at least four inches long and spaced approximately one-half inch apart are a most desirable arrangement. However, it is to be understood that the advantages of the present invention can also be realized with other plate sizes and gaps in accordance with the teachings herein.

In any event, it must be particularly noted that the collector plates, according to the present invention, can be greatly reduced in size from any arrangement as known in the prior art. This enables the present precipitator to utilize the desired high flow velocity of input gases. For instance, it is desired that a precipitator be able to operate directly in conventional gas streams having flow velocities of between 50 and 100 feet per second. This has not been possible with prior art precipitators since the prior art collection plate sizes requires the input gas stream to be slowed down to a flow velocity of 10 feet per second. Thus, in solving this problem, the precipitator of the present invention enables efficient operation in existing high flow velocity gas streams.

If desired, the plates may be curved to suit additional aerodynamic requirements of low flow loss or greater surface area or more effective collection than a flat plate, or for all these reasons.

Operation of the precipitator of this invention in a high gas flow velocity enables the elongated stationary charging wires to be kept clean from accidentally deposited dust particles by an aerodynamic flutter action. In fact, if desired, the charging wires can be formed into a circular or ribbon shape to enhance the cleaning of the wires by aerodynamic flutter.

Referring to FIGURES 1 and 2 there is illustrated an arrangement for cleaning the collector plates of the precipitated particles in a manner not possible with prior art precipitators. As previously mentioned, at the bottom of the precipitator housing 12 there is located a cleaning liquid return conduit 22 and a drying return conduit 24. Both of the return conduits 22 and 24 have an end 52 which extends into the housing 12 so as to sealingly engage one end of collector plates 28. As is shown most clearly in FIGURE 2 an extended cleaning section 54 of the housing 12 extends from the side wall 30 toward the side wall 32 of the housing 12, and inside of the rotating drum 36 in order to sealingly engage the inner end of the collector plates 28. Cleaning or treating of the collector plates 28 can then be accomplished by feeding a suitable liquid, such as water or suitable oils, or solutions through the opening in a housing flange 56. When handling oleum mist (containing sulfuric acid) or caustic dust, the cleaning liquid may contain neutralizing reagents. The cleaning liquid is directed into the cleaning section 54, through the collector plates 28, and exits through the liquid return conduit 22.

As shown most clearly in FIGURE 1, the precipitator also includes a drying or treating section 58 through which for instance, a high velocity of air can be directed to pass through the cleaned collection plates and out through the drying conduit 24. To protect the plates 28, the drying section may be eliminated and the plates may actually be renewed and coated by a film of a cleaning or treating liquid supplied through the housing flange 56 and into the cleaning or treating section 54. In the alternative, a liquid film of a different liquid can be supplied through the drying or treating section 58 for this purpose. In either event, the treating liquid may be acidic or caustic for gas treating. Such a liquid can, for instance, be an alkaline solution for treating gas laden with sulfur compound. In this case, the collector plates 28 will be deliberately wetted by the solution, and not only may the dust and mist be collected in the precipitator, but undesirable vapor components in the input gas stream may also be reduced.

Due to naturally endowed electrical charges on dust and mist, the precipitator unit will also collect the dust and mist even without the corona or charging wires turned on, although the capacity will be reduced. In fact, when the collector plates 28 are properly treated with a liquid film as previously mentioned, the vapor components of the dirty gas can be removed without using the corona or charging wires.

It is to be particularly noted that, if a high voltage direct current power supply is utilized, the grounded terminal of the supply can be coupled to terminal 50 and thereby grounding the collector plates 28. The other side of the D.C. supply will, of course, be connected to the charging wires 26 through terminals 46. As can be seen from FIGURE 1, since there are no charging wires in the section of the housing 12 where the suitable seals have defined a liquid cleaning section and a drying section, there is no requirement to remove or switch off the high voltage supply during the cleaning operation. Thus, the precipitator of this invention eliminated the switching of high voltage power sources during cleaning operations as required by prior art precipitators.

Although the principles of this invention have been illustrated showing the preferred embodiment of a rotary electro-aerodynamic precipitator, it is to be understood that alternative embodiments of this invention can be formed by those skilled in the art using the teachings herein. For example, an electro-aerodynamic precipitator using a series of stacked stationary collector plates and stationary charging wires can be readily constructed so as to form the electric field between the charging wires and the collector plates in the direction of the input dirty gas stream such as shown in FIGURE 3.

An alternate arrangement of the configuration shown in FIGURES 1 and 2 can also be provided, wherein the relative positions of the stationary charging wires 26 and of the collector plates 28 can be reversed. That is, the stationary charging wires 26 can be formed in a ring-like manner surrounding an inlet port with the collector plates 28 mounted on a rotating drum having a diameter greater than the diameter of the charging wire ring. The input dust laden gas stream can then enter through an axial inlet port within the charging wire ring. The gas stream is thus cleaned by passing through the charging wires, the substantially radial electric field, the collector plates 28, and finally exiting through an outlet port.

Also, it is feasible to stack stages of either the rotary or the stationary electro-aerodynamic precipitators in the series or parallel stages. That is, the configurations as illustrated and as described herein can also be arranged in a multi-stage fashion for thorough cleaning. With reference to FIGURE 1, this would require a second rotating drum having a series of collector plates 28, with the drum having a diameter greater than the diameter of the first ring of charging wires shown in FIGURE 1. A second ring of stationary charging wires is then provided the ring having a diameter greater than the diameter of the second rotating drum. In other words, the input gas stream would pass through two or more charging wire collector plate sets of the type shown in FIGURE 1. Alternately, in the aforementioned alternative configuration having the charging wires mounted in a ring with a smaller diameter than that of the rotating drum, a second set of similarly located charging wires and rotating drum can be provided.

As an example of the above two alternate arrangements, reference may be had to FIGURES 4–7 wherein there is illustrated an electro-aerodynamic precipitator having a ring of wire electrodes mounted inside of a rotating collector plate assembly utilizing the guided flow path principle of this invention. In FIGURE 7 there is illustrated a multi-stage precipitator constructed in accordance with the principles of this invention.

Referring now to FIGURES 4–6 there is illustrated a radial outflow precipitator 60 having a support housing 62 and having an inlet port 64 for receiving the dirty gases and an outlet port 66 through which the clean air is removed from the precipitator. A rear cover 68 seals off the rear end of the precipitator. At the opposite end, a similar cover plate 70 is mounted to the housing with a suitable cutout defining the input port 64. The rear cover 68 can also be replaced by another inlet flange and, together with port 64, to provide a design with double inlet.

The precipitator 60 contains essentially four basic parts—housing 62, cover plate 70, a detachable corona cage 72 (see FIGURE 6) which can be preassembled and merely slipped into place as a complete assembly; and a rotating member or rotor 74 containing a series of collector plates 76. The rotor 74 includes two oppositely spaced end plates 78 held spacially separated by three struts 80 comprising curved plates mounted into similarly curved slots in each end plate and welded thereto. As can be seen from FIGURE 5, the collector plates are welded or otherwise secured to corresponding slots in each end plate. It is preferred that the edges 82 of each collector plate are bent back away from the corona field so as to eliminate any sharp edges from confronting the corona field which may cause undesired arcing. For convenience of illustration, only a few of the collector plates 76 have been illustrated in FIGURE 4, it being understood that the series of plates continues as indicated by the dashed lines between the plates shown in this figure.

The rotor 74 is rotatably mounted to the housing 62 by means of three sets of rollers 84 suitably mounted on one side of the rotor to housing 62 and on the other rotor side to cover plate 70. The rollers 84 are spaced around and adjacent to the perimeter of each side of the rotor 74, with the rollers 84 engagaing a grooved portion 94 in each end plate. A ring gear 86 is rigidly secured to one of the end plates 78 and engages a driving pinion 88 driven by a motor 90—all of which are contained within an extention 92 of the cover plate 70.

The corona cage 72 is fixedly mounted to the housing 60 and contains the electrode wires 96 which are insulatably supported between the housing sides and in the path of the incoming gases. The corona cage 72 comprises to oppositely spaced end rings 98 having an open portion 10 for enabling suitable cleaning apparatus 102 to be mounted in the housing or formed as a part of the housing. The end rings 98 are maintained spacially separated by a series of support arms 104 having curved end sections 106 suitably welded to the inside perimeter 108 of the end rings. Each end ring contains a series of apertures equi-distantly spaced for receiving respective insulating inserts 110. The plurality of electrode wires 96 round the end rings extend through respective insulating inserts 110, and are electrically connected together by suitable means with an electrical line ending in a terminal 114 for connection to a source of high voltage. A suitable insulating cover 116 is provided at each end of the cage for insulatably covering the electrode ends to prevent undesirable shorting of the electrodes to parts of the housing. Suitable stops and clamps (not shown) can be provided between the housing 62 and insulating covers 116 for stopping the corona cage as it is inserted into position, and for maintaining the assembly securely in position on the housing.

Alternatively, the corona cage 72 can be formed entirely of insulating material to support the individual electrode wires or a continuous wire wound around the cage between the housing sides and in the path of the incoming dirty gases.

It must be particularly noted that the embodiment of this invention illustrated in the figures just described, also incorporates the guided flow path principle of the main invention, in that the inlet dirty gas stream is cleaned by passing through the charging electrode wires 96, and in the direction of the electric field between the charging wires and the collector plates 76. As the particles pass through the collector plates 76, the undesired particles are collected along the opposed faces between adjacent collector plates, and principally along the opposed collector plate surfaces adjacent to the edge 82 facing the electrodes. The cleaned gas stream then exists through the outlet port 66. If desired the precipitator may be operated in the vertical position, with the corona cage then being merely lowered vertically into position.

Suitable cleaning and/or treating elements 102 are provided in a similar manner as the previous radial inflow embodiment illustrated in FIGURES 1 and 2 for periodically cleaning or treating the collector plates. For instance, an extended cleaning conduit 120 extends through and is formed as a part of the housing 62—from the front of the housing towards the rear end near cover 68 for supplying a cleaning liquid such as water from the cleaning liquid inlet 124 through spray orifices into cleansing conduit 120. It is to be noted that since there are no electrodes in the cleaning region, there is no need to disconnect the high voltage supply during the cleaning operation. Furthermore, a shroud 126 is provided with suitable sealing edges engaging the edges 82 of the collector plates to prevent the cleansing liquid from inadvertently spraying back towards the electrodes. Drying air for drying the washed collector plates can be directed from a suitable air inlet 121 through orifices 119 and into the drying conduit 122. Drying conduit 122 extends between housing sides adjacent to and in a similar manner as the cleaning conduit. A sump 130 formed as an extension of the housing 62 below the cleaning section 102 receives the cleansing liquid which can be recirculated if desired. Any suitable cleansing liquid, steam, or steam-air mixture can be used for washing the plates 76.

In the embodiment shown in FIGURES 4–6, the high voltage supply is connected between the terminal 114 connected to the electrodes 96 and a suitable terminal connected to the housing 62. Since the collector plates 76, the end plates 78, and ring gear 86 are metallic members, the collector plates are each at the same potential with respect to the electrode wires. Suitable seals 132 and 134 can be provided for sealing the rotor 74 to the housing and thereby preventing the inlet gas stream from evading the charging field between electrodes 96 and the collector plates 76.

As an example of this aspect of the invention incorporating radial outflow and with the electrode wire ring located inside of the collector plate ring, the following information is furnished concerning a precipitator constructed in accordance with the invention:

Plates 76—114 plates, copper, 1/32" thickness, 3.58" long before bending (edge 82 to edge 82), 16 5/8" wide (distance between end plates 78), the plates having a 1/4" bend at edges 82;

Rotor 74—11" inside diameter, 14" outside diameter (radial distance between inner edge 82 facing electrodes and outer edge 82 facing outlet);

Struts 80—Three (each 1/8" thickness);

Electrodes 96—108 wires, 0.005" diameter, 16 5/8" long, separated 0.4 inch center to center, spaced about 1/2" from collector plate edges 82;

Voltage—12,000 volts, total corona current about three milliamperes;

Air flow—1200 c.f.m.

Efficiency—(based on ratio of collected to input weight of room dust)—approximately 99%;

Collector plate rotation—1/4 r.p.m.

In the constructed apparatus above, the rear cover plate 68 was removed so that the dirty gas input occurred through each end of the housing and into the corona cage.

As an alternative embodiment to the radial outflow aspect of this invention, the rotor end plates 78 can be divided by curved partition plates into a series of adjacent collection sections. A panel package containing a lightweight frame supporting a series of grouped collector plates in the frame can then be suitably mounted within each collection section extending between the end plates and the partition plates. If desired, a wire screen can be mounted so as to engage the partition plates to form a suitable electric field between the corona wires and the collection plates.

Referring now to FIGURE 7 there is illustrated still another embodiment of the invention wherein multiple precipitator stages have been provided in a radial outflow type precipitator as illustrated in FIGURES 4–6. The construction here is similar to that previously illustrated, and wherein two rotors 140 and 142 containing respective collector plates are mounted in the housing 144 by suitable roller means as previously illustrated. Also, two corona cages containing a series of respective electrodes 146 and 148 are mounted in fixed position on the housing 144 immediately adjacent respective collector plates on the rotors 140 and 142. That is, the electrodes 146 in a first corona cage are mounted immediately adjacent the collector plates associated with rotor 140. In a similar manner, a corona cage having electrode wires 148 is mounted immediately adjacent the collector plates contained on rotor 142. Driving means as previously illustrated can be supplied at drive points 150 and 152 to the respective rotors. Separate drive means can be provided, or if desired the driving means can be coupled so as to simultaneously rotate both rotor 142 and rotor 140. The inlet gas stream enters through either one or both of the inlet ports 154, 156, passes in a guided flow path through electrodes 148 and collection plates 158, electrodes 146 and collector plates 160, and exits via the outlet port 162.

Various alternative embodiments incorporating the principles of this invention can be utilized. For instance, the electrodes can be most suitably formed from wire sizes having diameters in the range of 0.005" to 0.250", with the particular wire size being selected as necessary for generation of a satisfactory corona field. The thickness of electrode wire selected also depends on the strength required as dictated by the electrode length and the particular operating conditions, such as the voltage requirement and the amount of air flow. Furthermore, in the alternative, instead of constant diameter wire as illustrated herein, an elongated somewhat greater diameter wire than the range previously indicated, with sharp points or projections on the outer surface of the wire can also be used to practice this invention. As shown in the illustration of the present invention, the collector plates can be formed of flat surfaces or curved surfaces, with the main concern being that the input gas stream is guided in a flow path which coincides substantially with the direction of the electric field and passes between opposed collector plate surfaces.

The term "high voltage" as used herein signifies an appropriate voltage level to sustain a corona discharge and it can vary from about 6,000 volts to around 100,000 volts depending on the thickness of the corona wire, and the spacing between the corona wires and the nearest portion of the collector plates. As an example, for those applications where ozone generation is of no conseqeunce, as high a voltage as is feasible can be utilized, whereas for air conditioning applications where the prevention of large ozone generation is an important factor, lower voltages would be preferred, that is, nearer to the lower limit of the above mentioned voltage range.

Instead of the individual electrode wires for the corona cage 72, the corona wires may also be lashed to one another circumferentially by another set of wires to give additional structural integrity to the corona cage or to improve ionization; or the individual corona wires may also be replaced by a wire gauze stretched over the corona cage. The corona cage 72 and the cleaning apparatus 102 may also be formed entirely of an insulating material with a continuous corona wire threaded through the apertures for the wires.

What is claimed is:

1. An electro-aerodynamic precipitator comprising:
   a housing having an inlet port extending between respective sides of said housing for receiving a flow of dust laden gases and an outlet port for removing clean gases;
   a ring of elongated thin conducting wires connected to a high voltage electrical source of a first polarity;
   insulating support means for insulatably supporting said ring of conducting wires between said respective sides of said housing entirely across the incoming path of said dust laden gases entering through said inlet port;
   said insulating support means supporting said thin wires only at each end thereof, enabling said thin wires to flutter during passage of said dust laden gases to remove any incidentally deposited dust particles from said wires;
   a rotating member rotatably mounted to said housing, said rotating member having an inner portion communicating with one of said ports on said housing;
   a plurality of closely spaced equipotential collector plates mounted to the perimeter of said rotating member immediately adjacent said ring of conducting wires and intermediate said ring and said outlet port;
   adjacent collector plates having respective opposed surfaces guiding the flow of said dust laden gases during the rotation of said plates in a guided flow path passing through said ring of elongated conducting wires to said outlet port;
   said plurality of collector plates connected to the opposite polarity of said high voltage electrical source, each of said plates at the same potential with respect to said conducting wires;
   a combined charging and depositing electric field formed between said conducting wires and each of said equipotential collector plates aligned substantially along said guided flow path of said dust laden gases to enhance the collection efficiency of said collector plates.

2. An electro-aerodynamic precipitator as claimed in claim 1, including means for cleaning said collector plates without disconnecting said electrical source from said plates.

3. An electro-aerodynamic precipitator as claimed in claim 1, including means for treating said collector plates with a solution for removing undesired vapor components from said gas stream.

4. An electro-aerodynamic precipitator as claimed in claim 1, wherein said outlet port is located on said housing in communication with said inner portion of said rotating member, and said ring of elongated conducting wires is insulatably supported on said housing at a position exterior to said rotating member inner portion and slightly beyond said perimeter of the rotating member, so that the input flow of dust laden gases entering said input port passes through said ring of elongated conducting wires, and is guided through said plurality of collector plates between said opposite surfaces of adjacent plates during rotation, through the inner portion of said rotating member, and exits from said housing through said outlet port.

5. An electro-aerodynamic precipitator comprising:
   a housing having an inlet port extending between respective sides of said housing for receiving a flow of dust laden gases and an outlet port for removing clean gases;
   a ring of elongated thin conducting wires for connection to a high voltage electrical source of a first polarity;
   insulating support means for insulatably supporting a ring of conducting wires on said respective sides of said housing entirely across the incoming path of said dust laden gases entering through said inlet port;
   said insulating support means supporting said thin wires only at each end thereof, enabling said thin wires to flutter during passage of said dust laden gases to remove any incidentally deposited dust particles from said wires;
   a rotating drum mounted to said housing, including a motor driven drive shaft rigidly mounted to said drum, and journal means mounted on the respective side of said housing opposite said outlet port for supporting said drum on said housing, said drive shaft rotatably engaging said journal means for rotation of said drum with respect to said housing;
   a pair of annular support members on said drum each having an outer diameter less than the outer diameter of said ring of conducting wires, one of said support members being immediately adjacent the respective side of said housing having said journal means mounted thereto, the other one of said annular support members being immediately adjacent the respective opposite side of said housing;
   a plurality of closely spaced equipotential collector plates mounted at each end thereof to said respective annular support members intermediate said ring and said outlet port, with an outer end of each of said collector plates immediately adjacent said ring of conducting wires and an inner end extending within the inner portion of said drum and communicating with said outlet port;
   adjacent collector plates having respective opposite surfaces guiding the flow of said dust laden gases during the rotation of said plates in a guided flow path passing through said ring of elongated conducting wires to said outlet port;
   said plurality of collector plates adapted for connection to the opposite polarity of said high voltage electrical source, each of said plates at the same potential with respect to said conducting wires, said collector plates, said housing, and said opposite polarity of said high voltage electrical source being interconnected and returned to ground potential;
   a combined charging and depositing electric field formed between said conducting wires and each of said equipotential collector plates aligned substantially along said guided flow path of said dust laden gases to enhance the collection efficiency of said collector plates;

said housing including a flange at a housing side, said flange having separate openings for introducing first cleansing liquids and then drying air to the inside portion of said drum at said inner ends of the collector plates;

a liquid cleansing conduit including a first section extending from one of said flange openings across the inner portion of said drum towards the opposite side of said housing and sealingly engaging the inner ends of said plates for guiding cleansing liquid supplied to said respective flange opening to the inner ends of said plates, and a second section of said liquid cleansing conduit comprising a return conduit sealingly engaging said outer ends of the collector plates for evacuating said cleansing liquid which has passed from said inner collector plate ends, between said plates, and through to the outer ends of said plates;

an air drying conduit including a first section extending from one of said flange openings across the inner portion of said drum towards the opposite side of said housing and sealingly engaging the inner ends of said plates for guiding drying air supplied to said respective flange opening to the inner ends of said plates, and a second section of said liquid drying conduit comprising a return conduit sealingly engaging said outer ends of the collector plates for evacuating said air which has passed between said plates and substantially dried the cleansing liquid from the collector plate surfaces.

6. An electro-aerodynamic precipitator as claimed in laim 1, wherein said inlet port is located on said housing n communication with said inner portion of said rotating member, and wherein said ring of elongated conducting wires is insulatably supported on said housing within aid rotating member inner portion, so that said input gas tream entering said input port passes through said ring of elongated conducting wires within the inner portion of aid rotating member, and is guided between said opposite surfaces of adjacent plates during rotation, through aid plurality of collector plates, and exits through said utlet port exterior to said rotating drum inner portion.

7. An electro-aerodynamic precipitator as claimed in laim 6, wherein said ring of conducting wires and said nsulating support means comprises a wire cage electrode ssembly insertable into said housing.

8. An electro-aerodynamic precipitator as claimed n claim 1, wherein said collector plates are curved.

9. A multi-stage electro-aerodynamic precipitator including the combination as claimed in claim 1, and further ncluding a second plurality of closely spaced collector lates mounted to said rotating member in the path of the as stream exiting from said first mentioned purality of ollector plates, and intermediate said outlet port and aid first plurality of collector plates, and a second ring of elongated conducting wires insulatably supported to aid housing intermediate said first and second plurality of collector plates, so that the input gases flow through said irst mentioned ring of elongated conducting wires, said first plurality of collector plates, said second ring of conducting wires, said second plurality of collector plates, and exit from said housing through said outlet port.

10. An electro-aerodynamic precipitating comprising:
a housing having an inlet port extending between respective sides of said housing for receiving a flow of dust laden gases and an outlet port for removing clean gases;
an elongated, thin electrode cage connected to a high voltage electrical source of a first polarity;
insulating support means for insulatably supporting said electrode cage between said respective sides of said housing entirely across the incoming path of said dust laden gases entering through said inlet port;
said insulating support means supporting said thin electrode cage only at each end thereof, enabling said thin cage to flutter during passage of said dust laden gases to remove any incidentally deposited dust particles from said cage;
a rotating member rotatably mounted to said housing, said rotating member having an inner portion communicating with one of said ports on said housing;
a plurality of closely spaced equipotential collector plates mounted to the perimeter of said rotating member immediately adjacent said electrode cage and intermediate said cage and said outlet port;
adjacent collector plates having respective opposed surfaces guiding the flow of said dust laden gases during the rotation of said plates in a guided flow path passing through said elongated, thin electrode cage to said outlet port;
said plurality of collector plates connected to the opposite polarity of said high voltage electrical source, each of said plates at the same potential with respect to said electrode cage:
a combined charging and depositing electric field formed between said electrode cage and each of said equipotential collector plates aligned substantially along said guided flow path of said dust laden gases to enhance the collection efficiency of said collector plates.

References Cited

UNITED STATES PATENTS

| | | | |
|---|---|---|---|
| 2,347,709 | 8/1944 | Penney | 55—145 X |
| 2,587,173 | 2/1952 | Landgraf | 55—153 |
| 2,715,944 | 8/1955 | Dohrer | 55—113 X |
| 2,798,572 | 7/1957 | Fields | 55—143 X |
| 2,987,137 | 6/1961 | Brixius et al. | 55—138 |
| 3,156,547 | 11/1964 | Fleck | 55—118 |

FOREIGN PATENTS

| | | |
|---|---|---|
| 231,786 | 4/1925 | Great Britain. |
| 418,551 | 10/1934 | Great Britain. |

HARRY B. THORNTON, Primary Examiner

D. E. TALBERT, Jr., Assistant Examiner

U.S. Cl. X.R.

55—113, 118, 120, 136, 145, 146, 149, 151, 154, 242, 290, 294, 278, 400